United States Patent [19]

Nakamura et al.

[11] Patent Number: 4,699,742
[45] Date of Patent: Oct. 13, 1987

[54] PROCESS FOR FORMING CALCIUM PHOSPHATE CERAMIC ARTICLES

[75] Inventors: Seishiro Nakamura; Katsutoshi Oukami, both of Kurashiki, Japan

[73] Assignee: Kuraray Co., Ltd., Kurashiki, Japan

[21] Appl. No.: 767,897

[22] Filed: Aug. 21, 1985

[30] Foreign Application Priority Data

Aug. 24, 1984 [JP] Japan ................................ 59-177247

[51] Int. Cl.$^4$ ............................................ C04B 33/32
[52] U.S. Cl. ........................................ 264/56; 264/311
[58] Field of Search ................................. 264/56, 311

[56] References Cited

U.S. PATENT DOCUMENTS

| 2,304,723 | 12/1942 | Wolff et al. ............................ 264/56 |
| 2,936,505 | 5/1960 | Witucki et al. ....................... 264/56 |
| 4,097,935 | 7/1978 | Jarcho .................................. 501/151 |
| 4,312,821 | 1/1982 | Jarcho et al. ......................... 264/299 |
| 4,624,808 | 11/1986 | Lange .................................... 264/56 |

OTHER PUBLICATIONS

Inorganic Syntheses, vol VII, pp. 63–65.

Primary Examiner—James Derrington
Attorney, Agent, or Firm—Burns, Doane, Swecker & Mathis

[57] ABSTRACT

An improved process for producing shaped ceramic articles of calcium phosphate by reacting calcium ions with phosphate ions in an aqueous medium at pH 8 or up to give gelatinous precipitates of calcium phosphate, with the molar ratio of calcium to phosphorus being 1.45 to 1.75, dispersing the precipitates into an aqueous medium to give a slurry containing 5 to 25 wt % of solids, casting the slurry into a mold conforming to the desired shape of the article and having the mold face finished sooth with a hydrophobic polymer or metal, drying the slurry at 130° C. or below to give a ceramic green body of calcium phosphate, and sintering the green body at 800° to 1400° C., wherein said improvement comprises casting the slurry into a centrifuge tube which functions as a mold, centrifugally separating the slurry into a supernatant layer and a precipitate layer containing less than 73 wt % of water with a centrifugal force greater than 1100 G, removing the supernatant liquid from the centrifuge tube, and drying the precipitate layer in the centrifuge tube. The green body of calcium phosphate is sintered to give a ceramic article of desired shape with no cracking.

4 Claims, No Drawings

PROCESS FOR FORMING CALCIUM PHOSPHATE CERAMIC ARTICLES

BACKGROUND OF THE INVENTION

1. Field of the Invention

The present invention relates to a process for forming shaped ceramic articles of calcium phosphate such as hydroxylapatite and calcium tertiary phosphate or a mixture thereof.

2. Description of the Prior Art

According to the conventional processes, shaped ceramic articles of calcium phosphate are produced by press molding calcium phosphate powder and sintering the preform under normal pressure (dry process); by hot-pressing calcium phosphate (dry process); or by drying and sintering, without crushing, the filter cake which is obtained when the precipitates of synthetic apatite are dehydrated by vacuum pressure filtration or centrifugal dehydration (wet process). An example of the wet process is disclosed in U.S. Pat. No. 4,097,935.

The dry process for calcium phosphate molding has a disadvantage in that calcium phosphate sticks to the mold face, making it difficult to form shaped articles of uniform structure. In addition, the dry process is not suitable for producing small articles of complex shape. They are usually produced by fabricating a previously made large block and then cutting the large block to an article of desired shape by tools. As compared with the dry process, the wet process is easier to perform, and it is suitable for producing small shaped articles. Yet, it has a disadvantage in that the filter cake is liable to cracking or fracture in the drying process. Moreover, the wet process is only capable of producing shaped articles in the form of thin plate (10 to 11 mm in length, 4 to 5 mm in width, and 2 to 3 mm in thickness), as described in U.S. Pat. No. 4,097,935.

The improvement on the wet process is described in U.S. Pat. No. 4,312,821. According to this U.S. Patent, an aqueous suspension of calcium phosphate is cast into a mold, with the surface thereof coated with a lubricant, followed by drying under a mild condition. This process permits the production of larger articles (measuring $18 \times 9 \times 9$ mm). This process still has a disadvantage in that the castable aqueous suspension of calcium phosphate contains as much water as 75 to 95% and the high water content causes minute cracks even when drying is performed under a mild condition. This makes it difficult to produce crack-free products in high yields and leads to troublesome drying.

SUMMARY OF THE INVENTION

The present inventors have now succeeded in efficiently producing shaped ceramic articles of calcium phosphate which are completely free of cracks, by casting a calcium phosphate slurry into a centrifuge tube of desired shape, centrifugally separating the slurry into a precipitate layer and a supernatant liquid, and drying and sintering the precipitate layer (which has a desired shape and a low water content).

Accordingly, it is an object of this invention to provide an improved wet process for producing crack-free shaped ceramic articles of calcium phosphate.

It is another object of this invention to provide a process for efficiently producing shaped ceramic articles of calcium phosphate in high yields from a calcium phosphate slurry.

The gist of this invention resides in an improved process for producing shaped ceramic articles of calcium phosphate by reacting calcium ions with phosphate ions in an aqueous medium at pH 8 or up to give gelatinous precipitates of calcium phosphate, with the molar ratio of calcium to phosphorus being 1.45 to 1.75, dispersing the precipitates into an aqueous medium to give a slurry containing 5 to 25 wt% of solids, casting the slurry into a mold conforming to the desired shape of the article and having the mold face finished smooth with a hydrophobic polymer or metal, drying and slurry at 130° C. or below to give a ceramic green body of calcium phosphate, and sintering the green body at 800° to 1400° C., wherein said improvement comprises casting the slurry into a centrifuge tube having the function of a mold, centrifugally separating the slurry into a supernatant layer and a precipitate layer containing less than 73 wt% of water with a centrifugal force greater than 1100 G, removing the supernatant liquid from the centrifuge tube, and drying the precipitate layer in the centrifuge tube.

DETAILED DESCRIPTION OF THE INVENTION

The present invention relates to an improvement on the process for producing ceramic shaped articles of calcium phosphate disclosed in U.S. Pat. Nos. 4,097,935 and 4,312,821. According to these U.S. Patents, a slurry containing gelatinous precipitates of calcium phosphate is cast into a mold of hydrophobic polymer or metal and the slurry is dried in the mold under a mild condition to give a green body of calcium phosphate, which is subsequently sintered. The improvement in this invention comprises casting the slurry into a centrifuge tube which functions as a mold, centrifugally separating the slurry into a supernatant layer and a precipitate layer containing less than 73 wt% of water with centrifugal force greater than 1100 G, removing the supernatant liquid from the centrifuge tube, and drying the precipitate layer in the centrifuge tube. In the process disclosed in U.S. Pat. No. 4,312,821, a slurry containing 75 to 95% of water is cast into a mold and dried in the mold, whereas in the process of this invention, a slurry is cast into a centrifuge tube which functions as a mold and the slurry is separated by centrifuging into a supernatant liquid and a precipitate layer containing less than 73 wt% of water, and the precipitate layer is dried in the centrifuge tube, whereby shaped articles free of cracks are produced in good yields. The process of this invention is described below in the order of production steps.

In the first step, calcium ions are reacted with phosphate ions in an aqueous medium at pH 8 or up, preferably pH 10 to 12 to give gelatinous precipitates of calcium phosphate, with the molar ratio of calcium to phosphorus being 1.45 to 1.75. For example, calcium hydroxide is reacted with phosphoric acid, or calcium nitrate is reacted with ammonium hydrogen phosphate to give gelatinous precipitates of calcium phosphate such as hydroxylapatite [$Ca(OH)_2 \cdot 3Ca_3(PO_4)_2$] (Ca/P atomic ratio: 1.67) or calcium tertiary phosphate [$Ca_3(PO_4)_2$] (Ca/P atomic ratio: 1.5). (For more detail about reaction conditions, refer to U.S. Pat. No. 4,097,935 and "Inorganic Synthesis", (1983), Vol. 7, p. 63, Hayek et al.) What is preferred in the process of this invention is that the reaction should be performed at 25° C. or below so that the precipitate particles of calcium phosphate does no grow large. Excessively large precipitate particles cause cracking in the drying step that follows the centrifuging step.

After the reaction of calcium ions with phosphate ions, the gelatinous precipitates of calcium phosphate can be separated from the liquid phase by filtration or centrifugal dehydration. The precipitates are washed until the washings are not alkaline any longer. The thus obtained gelatinous precipitates are dispersed into water to make a slurry.

According to this invention, the slurry concentration (the ratio of the weight of calcium phosphate to the total weight of slurry) should be 5 to 25 wt.%. Below 5 wt%, the precipitate layer formed after centrifuging contains excess water and consequently are liable to cracking in the step of drying in the centrifuge tube. Above 25 wt%, the slurry is too viscous to be easily cast into the centrifuge tube.

The slurry thus prepared is placed in a centrifuge tube which functions as a mold. The shape of the centrifuge tube is established according to the desired configuration of the shaped articles of calcium phosphate. Also, the dimensions of the centrifuge tube are established according to the shrinkage of the precipitate layer that takes place during drying and sintering. The volume shrinkage factor is about 10 to 40%. The shape of the centrifuge tube is usually selected so that cylindrical or conical shaped articles are obtained. They are suitable for end use as a carrier or an implant material for living tissues. The configuration of the shaped particle of calcium phosphate is made in the centrifuge tube; but it is also possible to cut the shaped article partially after sintering into a desired configuration.

According to this invention, the centrifuge tube should have a volume of 0.5 to 100 ml, preferably 2 to 50 ml. Where the volume of the centrifuge tube is less than 0.5 ml or greater than 100 ml, cracking tends to occur due to uneven drying when the calcium phosphate is dried in the centrifuge tube.

According to this invention, the material of the inside of the centrifuge tube to which calcium phosphate comes into contact is particularly important. It should be a hydrophobic polymer or metal. It is considered that a hydrophobic polymer or metal prevents calcium phosphate from sticking to the inner wall of the centrifuge tube when water is removed from the precipitate layer of calcium phosphate and hence cracking does not occur. Examples of the hydrophobic polymer include polyolefin, polystyrene, telfon. polycarbonate, polymethyl acrylate, and polymethyl methacrylate, all having a water absorption less than 10%. Examples of the metal include stainless steel, titanium alloy, aluminum alloy, and brass. Preferable among them are polyethylene, polypropylene, teflon, stainless steel, and titanium alloy. In the case of a centrifuge tube with its inside coated with polyvinyl alcohol or any other hydrophilic polymer, or in the case of a centrifuge tube made of glass, calcium phosphate sticks to the inside of the centrifuge tube during drying, causing cracking to take place in calcium phosphate layer. According to this invention, the inside wall of the centrifuge tube is made of the above-mentioned material, and it may be coated with a lubricant as disclosed in U.S. Pat. No. 4,312,821.

The slurry placed in the centrifuge tube is separated by centrifuging into a supernatant liquid layer and a precipitate layer containing less than 73 wt% of water. (The water content is calculated from the formula $W/(S+W) \times 100$, where W is the weight of water and S is the weight of solids.) The supernatant liquid is removed by decantation. Thus there is obtained the precipitate layer in a mold. Concentrating the slurry by centrifuging to reduce the water content in the precipitate layer below 73 wt% reduces shrinkage and deformation in the subsequent drying step. This, along with the non-sticking properties of the inside wall of the centrifuge tube, permits a green body to be produced in conformity to the configuration of the mold. The concentration of a slurry to such an extent requires a centrifugal force greater than 1100 G (G means gram-weight, that is, 980 dynes). Preferably, the water content should be reduced to 65 to 70 wt% with a centrifugal force of about 5000 G. If the water content is reduced below 60 wt% by excessive centrifuging, the resulting precipitate layer is so tight that cracking is easy to occur. In the process of this invention, a swing type centrifugal machine is used, and centrifuging is performed for 5 to 60 minutes.

To remove water from the precipitate layer, the centrifuge tube holding the precipitate layer is heated. Sudden heating that causes shrinkage and cracking should be avoided. The heating temperature is in the range from room temperature to 130° C. At a temperature below room temperature, the drying of the precipitate layer takes a long time; and at a temperature above 130° C., cracking is easy to occur in the precipitate layer. Upon removal of water, the precipitate layer of calcium phosphate separates from the inside wall of the centrifuge tube due to shrinkage. In this way, the green body of calcium phosphate is obtained.

The green body is then sintered at 800° to 1400° C. to impart sufficient mechanical strength for use as a catalyst carrier and an implant material for living tissues. At a sintering temperature below 800° C., the resulting shaped article of calcium phosphate does not have sufficient mechanical strength. At a sintering temperature above 1400° C., calcium phosphate is decomposed and cracking takes place. This cracking causes the shaped article to break when it undergoes secondary fabrication such as cutting.

According to this invention, the calcium phosphate slurry may be incorporated with other inorganic compounds such as silica, alumina, titania, and zirconia in an amount less than 10 wt%, which are preferably in the form of sol such as silica sol and alumina sol. According to this invention, the calcium phosphate slurry may be incorporated with collagen, cellulose powder, polyvinyl alcohol, and other organic substances in an amount less than 5 wt%, preferably 0.1 to 1 wt% based on the amount of calcium phosphate.

As mentioned above, according to the process of this invention, the calcium phosphate layer in the centrifuge tube readily separates from the inside wall of the centrifuge tube after drying, and the cracking free green body of calcium phosphate which conforms to the configuration of the centrifuge tube is efficiently obtained. The green body is finally sintered at a proper temperature to give shaped articles of calcium phosphate which are useful as artificial dental roots, artificial teeth, implant materials for living tissues, and immobilized enzyme carriers. The use as implant materials for living tissues is most promising in view of their high compatibility with living tissues.

This invention is more particularly described by the following examples, which are merely illustrative of this invention, and should not be construed as imposing any restrictions on either the spirit or scope thereof.

EXAMPLE 1 AND COMPARATIVE EXAMPLE 1

250 g of commercial calcium nitrate [$Ca(NO_3)_2 \cdot 4H_2O$] was dissolved in 0.7 liters of distilled water. To the resulting solution was added 0.79 liters of 28% ammonia water, and the solution was diluted with 0.3 liters of distilled water. On the other hand, 84 g of commercial ammonium hydrogen phosphate [$(NH_4)_2HPO_4$] was dissolved in 1 liter of distilled water. To the resulting solution were rapidly added 0.48 liters of 28% ammonia water and 1 liter of distilled water. The aqueous solution of ammonium hydrogen phosphate at 20° C. was added dropwise with stirring to the previously made aqueous solution of calcium nitrate, while keeping the solution temperature at 20° C. With continued stirring, the mixed solution was heated and kept at 80° C. under reflux for 20 minutes. After cooling, the solution was allowed to stand for two days. The precipitates in the solution were separated by the use of a centrifugal dehydrator equipped with a polypropylene filter cloth (1000 mesh). The precipitates on the filter cloth were washed with distilled water until the washings were not alkaline any longer.

The precipitates of calcium phosphate thus obtained were dispersed into distilled water to give a 20 wt% slurry. 8 ml each of the slurry was placed in 32 pieces of polypropylene centrifuge tubes (16.5 mm in outside diameter, 105 mm in length, conical shape, and 10 ml in volume). Four each of the centrifuge tubes were mounted on a swing type centrifugal machine, and centrifuging was performed at 4500 rpm (4770 G) for 10 minutes. The supernatant liquid in the centrifuge tube was discarded. The centrifuge tubes each holding the calcium phosphate layer containing 70 wt% of water were placed in an electric drier at 80° C. for 1 day and at 120° C. for another 1 day. The calcium phosphate layer thus dried readily separated without cracking from the inside wall of the centrifuge tube. In this way, there were obtained 32 pieces of conical green bodies of calcium phosphate (8.0 mm in maximum diameter and 29.5 mm in length).

The calcium-to-phosphoric atomic ratio measured by using two of the 32 green bodies was 1.67. Three each of the remaining 30 green bodies were sintered at varied temperatures in an electric furnace. The temperature of the electric furnace was raised at a rate of 300° C./hour and the predetermined sintering temperature was kept for 2 hours. The shaped ceramic articles of calcium phosphate thus obtained were examined for surface area, pore volume, relative density, and cracking. The results are shown in Table 1. The shaped articles were also examined for workability by cutting with a two-sided diamond disk, 0.15 mm thick, driven at 19000 rpm by a dental high-speed drill.

The surface area was measured by nitrogen absorption method with a BET apparatus, and the pore volume was measured by high-pressure mercury porosimetry. Calcium was determined by EDTA titration and phosphorus was determined by the use of phosphomolybdate reaction.

TABLE 1

| Example No. | Sintering temperature (°C.) | Dimensions of green body (mm) (dia. × length) | Surface area ($m^2/g$) | Pore volume (ml/g) | Relative density (%) | Cracking during sintering* | Breakage during cutting** |
|---|---|---|---|---|---|---|---|
| Comparative Example 1-1 | 600 | 7.8 × 28.8 | 50 | 0.42 | 59 | 0 | 3 |
| Comparative Example 1-2 | 750 | 7.6 × 28.1 | 32 | 0.40 | 45 | 0 | 2 |
| Example 1-1 | 800 | 7.5 × 27.6 | 19 | 0.39 | 42 | 0 | 0 |
| Example 1-2 | 900 | 6.5 × 23.4 | 10 | 0.21 | 69 | 0 | 0 |
| Example 1-3 | 1000 | 6.0 × 22.0 | 0.8 | 0.04 | 87 | 0 | 0 |
| Example 1-4 | 1100 | 5.8 × 21.2 | 0.5 | 0.005 | 97 | 0 | 0 |
| Example 1-5 | 1200 | 5.6 × 20.5 | 0.4 | 0.002 | 98 | 0 | 0 |
| Example 1-6 | 1300 | 5.6 × 20.4 | 0.4 | 0.002 | 99 | 0 | 0 |
| Example 1-7 | 1400 | 5.5 × 20.0 | 0.3 | 0.003 | 96 | 0 | 0 |
| Comparative Example 1-3 | 1450 | — | 0.3 | 0.002 | — | 2*** | 3 |

*Number of cracked green bodies out of three.
**Number of broken sintered bodies out of three.
***Broken into several blocks.

COMPARATIVE EXAMPLE 2

At first, a 20 wt% slurry of calcium phosphate was prepared in the same manner as in Example 1. A portion of this slurry was placed in a pressure filter equipped with a 400 mesh filter of sintered stainless steel (having a sample box measuring 10 mm wide, 30 mm high, and 30 mm long). By applying a pressure of 3 $kg/cm^2$, there was obtained a green body of calcium phosphate containing 68 wt% of water (measuring 10×8×30 mm). After repeating the above-mentioned process, there were obtained 32 pieces of green bodies. When dried under the same conditions as in Example 1, they all cracked due to uneven distribution of water in the green body.

EXAMPLE 2

74 g of commercial calcium hydroxide was dissolved in 2 liters of distilled water. To the resulting solution was added dropwise with vigorous stirring 1.96 liters of 3.0 wt% aqueous solution of phosphoric acid, while keeping the solution temperature at 20° C. With continued stirring, the mixed solution was heated to 80° C., and kept at 80° C. for 30 minutes. After cooling, the solution was allowed to stand at 20° C. for three days. The precipitates in the solution were separated by the use of a centrifugal dehydrator equipped with a polypropylene filter cloth (1000 mesh). The precipitates on the filter cloth were washed with distilled water until the washings were not alkaline any longer.

The precipitates of calcium phosphate thus obtained were dispersed into distilled water to give a 19 wt% slurry. The slurry was placed in four stainless steel centrifuge tubes (1.65 mm in outside diameter, 105 mm in length, cylindrical with a round bottom, and 10 ml in volume). The centrifuge tubes were mounted on a swing type centrifugal machine, and centrifuging was performed at 5000 rpm (5300 G) for 15 minutes. The supernatant liquid in the centrifuge tube was discarded.

The four centrifuge tubes each holding the calcium phosphate layer containing 65 wt% of water were placed in an electric drier at 70° C. for 1 day and at 120° C. for another 2 days. The calcium phosphate layer thus dried readily separated without cracking from the inside wall of the centrifuge tuve. In this way, there were obtained four pieces of cylindrical green bodies of calcium phosphate (8.0 mm in diameter and 8.5 mm in length).

The calcium-to-phosphorus atomic ratio measured by using one of the four green bodies was 1.65. The remaining three green bodies were heated from room temperature in 1150° C. over 3 hours and sintered at 1150° C. for 1 hour in an electric furnace. Thus there were obtained three shaped ceramic articles of calcium phosphate each measuring 5.8 mm in diameter and 6.1 mm in length. They were of compact structure with no cracks. The X-ray diffraction pattern of the sintered calcium phosphate coincided with that of hydroxylapatite.

The surface area, pore volume, and relative density of the shaped ceramic article of calcium phosphate were 1.2 m$^2$/g, 0.1 ml/g, and 95%, respectively.

COMPARATIVE EXAMPLE 3

Example 2 was repeated except that the centrifuge tubes holding the calcium phosphate precipitate layer were dried at 140° C. for 1 day in an electric furnace. After drying, the green bodies were readily separated from the inside wall of the centrifuge tube but broken into several pieces upon removal from the centrifuge tube, presumably due to an excessively high drying temperature.

COMPARATIVE EXAMPLE 4

Example 2 was repeated except that the centrifuge tubes of stainless steel were replaced by those of glass of the same size. After drying, the precipitate layer of calcium phosphate stuck to the inside wall of the centrifuge tube, and the green bodies removed from the centrifuge tubes were broken except one. Cracks were found on the surface of all green bodies. Upon sintering in the same manner as in Example 1, more cracks appeared on the sintered bodies than on the green bodies.

EXAMPLE 3

Example 2 was repeated except that the centrifuge tubes of stainless steel were replaced by those of the size as shown in Table 2 and the amount of calcium phosphate slurry placed in the centrifuge tube was changed as shown in Table 2. After drying, the green bodies were removed from the centrifuge tubes and examined for cracking. The results are shown in Table 2. Cracking occurred when centrifuge tubes of large capacity were used.

EXAMPLE 4

88 g of commercial calcium hydroxide was dissolved in 2 liters of distilled water. To the resulting solution was added dropwise with vigorous stirring 2.0 liters of 3.9 wt% aqueous solution of phosphoric acid, while keeping the solution temperature at 15° C. The solution was adjusted to pH 8-9 with 5% ammonia water. Stirring was continued for 3 hours at 15° C. The precipitates of calcium phosphate were collected by filtration and washing in the same manner as in Example 2. The precipitates of calcium phosphate were dispersed into distilled water to give a 20 wt% slurry.

The slurry (4 ml each) was placed in four teflon centrifuge tubes (12 mm in outside diameter, 75 mm in length, cylindrical with a round bottom, and 5 ml in volume). Centrifuging was performed in the same manner as in Example 2. The calcium phosphate layer containing 65 wt% of water was dried to give green bodies of calcium phosphate. All the green bodies were found to be free of cracking.

The calcium-to-phosphorus atomic ratio measured by using one of the four green bodies was 1.50. The remaining three green bodies were sintered in the same manner as in Example 2. The shaped ceramic articles of calcium phosphate thus obtained were of compact structure with no cracks. The X-ray diffraction pattern of the sintered calcium phosphate coincided with that of sodium $\beta$-phosphate.

The surface area, pore volume, and relative density of the shaped ceramic article of calcium phosphate were 0.8 m$^2$/g, 0.06 ml/g, and 97%, respectively.

EXAMPLE 5

250 g of commercial calcium nitrate [Ca(NO$_3$)$_2$.4-H$_2$O] was dissolved in 0.7 liters of distilled water. To the resulting solution was added 0.08 liters of 28% ammonia water, and the solution was diluted with 0.3 liters of distilled water. On the other hand, 84 g of commercial ammonium hydrogen phosphate [(NH$_4$)$_2$HPO$_4$] was distilled in 1 liter of distilled water. To the resulting solution were rapidly added 0.48 liters of 28% ammonia water and 1 liter of distilled water. The aqueous solution of ammonium hydrogen phosphate was added dropwise with stirring to the previously made aqueous solution of calcium nitrate, while keeping the solution temperature at 15° to 16° C. With continued stirring, the mixed solution was heated under reflux for 20 minutes. After cooling, the solution was allowed to stand for 24 hours. The precipitates in the solution were separated by the use of a centrifugal dehydrator equipped with a polypropylene filter cloth (1000 mesh). The precipitates on the filter cloth were washed with distilled water until the washings were not alkaline any longer.

TABLE 2

| Dimensions of centrifuge tube (O.D. × Length) | Volume of centrifuge tube (ml) | Shape of centrifuge tube | Amount of calcium phosphate slurry (ml) | Number of cracked green bodies out of four |
| --- | --- | --- | --- | --- |
| 16.5 × 110 | 10 | Conical | 5 | 0 |
| 16.5 × 110 | 10 | Cylindrical | 5 | 0 |
| 24 × 100 | 25 | Cylindrical | 10 | 0 |
| 35 × 100 | 50 | Cylindrical | 20 | 0 |
| 45 × 100 | 100 | Cylindrical | 60 | 1* |
| 60 × 100 | 120 | Cylindrical | 60 | 1** |

*Cracking was observed on the surface although the green body kept its form.
**The green body cracked into two pieces at the center.

The precipitates of calcium phosphate thus obtained were dispersed into distilled water to give a 15 wt% slurry. 4 ml each of the slurry was placed in 120 pieces of polypropylene centrifuge tubes, the inside wall of which was thinly coated with liquid paraffin (16.5 mm in outside diameter, 105 mm in length, conical shape, and 10 ml in volume). Twenty each of the centrifuge tubes were mounted on a centrifugal machine, and centrifuging was performed for 15 minutes at varied rpm as shown in Table 3. The supernatant liquid in the centrifuge tube was discarded. The centrifuge tubes each holding the calcium phosphate layer were placed in an electric drier at 80° C. for 1 day. The green bodies of calcium phosphate thus obtained were examined for cracking. The results are shown in Table 3.

TABLE 3

| Conditions of centrifuging | | Water content in precipitate layer after removal of supernatant liquid | No. of green bodies of calcium phosphate which cracked out of twenty pieces |
| --- | --- | --- | --- |
| Centrifugal force (G) | Speed of revolution (rpm) | | |
| 1000 | 940 | 77 | 11 |
| 1100 | 1040 | 73 | 2 |
| 5000 | 4720 | 67 | 0 |
| 7500 | 7070 | 65 | 0 |
| 9700 | 9150 | 63 | 0 |
| 11000 | 10400 | 62 | 3 |

COMPARATIVE EXAMPLE 5

A 15 wt% slurry of calcium phosphate was prepared in the same manner as in Example 5. This slurry was filled into 20 polyethylene containers (measuring 40×40×40 mm) with the inside wall thereof coated with liquid paraffin. Ten of the containers were dried in a drier at 80° C. for 1 day, and the remaining ten containers were dried at 50° C. for 2 days. (Centrifuging was not performed.) In the former case, cracking occurred in nine out of ten; and in the latter case, cracking occurred in four out of ten.

What is claimed is:

1. An improved process for producing shaped ceramic articles of calcium phosphate comprising reacting calcium ions with phosphate ions in an aqueous medium at pH 8 or up to give gelatinous precipitates of calcium phosphate, with the molar ratio of calcium to phosphorus being 1.45 to 1.75, dispersing the precipitates into an aqueous medium to give a slurry containing 5 to 25 wt% of solids, casting the slurry into a centrifuge tube which functions as a mold conforming to the desired shape of the article and having the mold face finished smooth with a hydrophobic polymer or a metal, centrifugally separating the slurry into a supernatant layer and a precipitate layer containing less than 73 wt% of water with a centrifugal force greater than 1100 G, removing the supernatant liquid from the centrifuge tube, drying the precipitate layer of the slurry in the centrifuge tube at 130° C. or below to give a ceramic green body of calcium phosphate, and sintering the green body at 800° to 1400° C.

2. A process for producing shaped ceramic articles of calcium phosphate as claimed in claim 1, wherein the centrifuge tube has a volume of 0.5 to 100 ml.

3. A process for producing shaped ceramic articles of calcium phosphate as claimed in claim 1, wherein the centrifuge tube has such a configuration that provides a cylindrical or conical green body.

4. A process for producing shaped ceramic articles of calcium phosphate as claimed in claim 1, wherein the centrifuging is performed such that the water content in the precipitate layer of calcium phosphate is higher than 60 wt%.

* * * * *